(12) United States Patent
Vadekar et al.

(10) Patent No.: US 8,566,791 B2
(45) Date of Patent: Oct. 22, 2013

(54) RETROFITTING AUTHENTICATION ONTO FIRMWARE

(75) Inventors: Ashok Vadekar, Rockwood (CA); Brian Neill, Burlington (CA)

(73) Assignee: BlackBerry Limited, Waterloo, Ontario (CA)

( * ) Notice: Subject to any disclaimer, the term of this patent is extended or adjusted under 35 U.S.C. 154(b) by 1960 days.

(21) Appl. No.: 11/418,462

(22) Filed: May 5, 2006

(65) Prior Publication Data
US 2007/0156638 A1 Jul. 5, 2007

Related U.S. Application Data

(60) Provisional application No. 60/677,816, filed on May 5, 2005.

(51) Int. Cl.
*G06F 9/44* (2006.01)

(52) U.S. Cl.
USPC .............................. 717/124; 717/110; 717/126

(58) Field of Classification Search
None
See application file for complete search history.

(56) References Cited

U.S. PATENT DOCUMENTS

| | | | |
|---|---|---|---|
| 4,849,927 A | 7/1989 | Vos | |
| 5,954,817 A | 9/1999 | Janssen et al. | |
| 6,026,293 A * | 2/2000 | Osborn | 455/411 |
| 6,138,236 A * | 10/2000 | Mirov et al. | 726/26 |
| 6,480,800 B1 * | 11/2002 | Molyneaux et al. | 702/120 |
| 6,571,335 B1 | 5/2003 | O'Donnell et al. | |
| 7,142,891 B2 * | 11/2006 | Shankar et al. | 455/566 |
| 2004/0268339 A1 | 12/2004 | Van Someren et al. | |
| 2006/0101310 A1 * | 5/2006 | Diamant et al. | 714/38 |
| 2006/0137022 A1 * | 6/2006 | Kilian-Kehr et al. | 726/27 |
| 2006/0143600 A1 | 6/2006 | Cottrell et al. | |
| 2006/0230451 A1 * | 10/2006 | Kramer et al. | 726/22 |

FOREIGN PATENT DOCUMENTS

| | | |
|---|---|---|
| EP | 0849657 A1 | 6/1998 |
| JP | 10-207776 A | 8/1998 |
| JP | 11-134189 A | 5/1999 |

(Continued)

OTHER PUBLICATIONS

Spinellis, Diomidis. Reflection as a Mechanism for Software Integrity Verification. Transactions on Information and System Security, vol. 3, No. 1 [online] (Feb. 2000). ACM, pp. 51-62. Retrieved From the Internet <http://portal.acm.org/ft_gateway.cfm?id=353383 &type=pdf&coll=GUIDE&dl=GUIDE,ACM&CFID=75156848 &CFTOKEN=65458070>.*

(Continued)

*Primary Examiner* — Emerson Puente
*Assistant Examiner* — Jonathan R Labud
(74) *Attorney, Agent, or Firm* — Etienne de Villiers; Dimock Stratton LLP

(57) ABSTRACT

The present invention provides an inexpensive, software-based security-retrofit solution to verify the integrity of program code in embedded systems, or accessories, without resorting to expensive hardware changes. All unused memory on an accessory that could be used to store a program code image is filled with random data. A host system also locally stores a copy of the accessory's program image containing the random data. The host system sends the accessory a list of memory addresses or memory ranges on the accessory, which is always different and random in nature. The accessory will then produce a digest using values stored in the memory addresses as inputs to a secure hash function. The host system verifies the integrity of the embedded program code by verifying the resulting digest produced by and returned from the accessory.

15 Claims, 3 Drawing Sheets

(56) References Cited

FOREIGN PATENT DOCUMENTS

| JP | 2004-509392 A | 3/2004 |
| JP | 2005-301968 A | 10/2005 |
| JP | 2006-191491 A | 7/2006 |
| WO | WO 00/18162 | 3/2000 |

OTHER PUBLICATIONS

Seshadri, A. et al. ; "SWATT: SoftWare-based ATTestation for Embedded Devices"; Proceedings of the 2004 IEEE Symposium on Security and Privacy; May 9-12, 2004; Berkley, CA, U.S.A.; pp. 272 to 283; IEEE Computer Society.

* cited by examiner

RETROFITTING AUTHENTICATION ONTO FIRMWARE

CROSS REFERENCE TO RELATED APPLICATIONS

This application claims priority from U.S. provisional application 60/677,816 filed on May 5, 2005 the content of which is hereby incorporated by reference.

FIELD OF INVENTION

The invention relates generally to the field of cryptography. In particular, the invention relates to providing an inexpensive, software-based security-retrofit solution to verify the integrity of program code in embedded systems.

BACKGROUND OF THE INVENTION

Computer systems typically use peripheral devices to supplement their functionality. Within this context, the computer system is called a host system and its peripheral devices are called accessories. Accessories are often devices capable of computation, as they are typically built using micro-processors or micro-controllers that can be programmed and re-programmed with program code, micro-code or firmware. The functionality and correct operation of these accessories are reliant on the correctness of the program code that resides in the accessory.

There are occasions when a fielded accessory needs to be upgraded or retrofitted because of a deficiency discovered in the program code. For example, it may be necessary to upgrade a high-risk instrument in high-value applications, such as medical devices. These types of devices are often regulated by the government. When a deficiency is discovered and re-design is underway, a quick stop-gap solution may be available. It may therefore be desirable that such a solution be applied to the devices already deployed in the field.

Individuals may maliciously alter the accessory's program code so that it performs unauthorized operations, from the perspective of the host system, yet fools the host system into believing nothing is amiss by reporting normal behavior. It is desirable that any unauthorized modification of the accessory's program code be detected before an upgrade is applied and that an upgrade is applied only if no such unauthorized modification is detected.

One solution to this problem is to design security into accessories before they are fielded, for example, by using secure micro-controllers that authenticate all micro-code upgrades before being accepted. However, it is sometimes the case that when an accessory is first fielded, security concerns and risk levels are low, but over time, circumstances change such that the risk associated with the unsecured accessory unexpectedly increases. The cost to replace or make hardware changes to the accessory may be deemed too expensive, at which point, the host system has an unsecured accessory in a high-risk environment.

A naïve solution to this problem is to allow the host system to read all of the program code from the accessory, compute a digest using a secure hashing function, and compare the result to some locally maintained digest. There are two problems with this approach. First, the accessory could be reprogrammed such that it maintained a copy of the original program code, usurped read requests from the host system, and returned to the host system the original stored program code image. Second, the program code stored on the accessory may be too large to be effectively transmitted over a slow serial connection, or may not even be remotely accessible. In these instances, it is more effective to calculate a digest to be returned to the host system for validation.

Simply calculating a digest, even using a challenge-response mechanism, may not effectively defeat an altered accessory that is maintaining a copy of the original program code in memory somewhere on the accessory.

It is an object of the present invention to mitigate or obviate at least one of the above mentioned disadvantages.

SUMMARY OF THE INVENTION

In general terms, the invention comprises filling all unused memory on an accessory device, that could be used to store a program code image, with high entropy random data. A host system must also have access to a trusted copy of the accessory's memory image containing the random data.

The existing program on the accessory has an application program interface (API) that can be called by the host system. The accessory may be re-written where necessary to include an additional API, if the accessory does not already have one. The host system uses the API to send the accessory a list of memory addresses or memory ranges on the accessory. This list is always different and truly unpredictable to prevent the list from being guessed by the accessory ahead of time. The accessory will then produce a representative value that is determined from the list and the values of the accessory device's memory referenced by the list. Preferably, the representative value is a digest using memory values at the supplied memory addresses as inputs to a secure hash function. The resulting digest, produced by the accessory, is returned to the host system for validation.

By padding memory with random data, an attacker is prevented from having enough room on the accessory to replace the program image and maintain the old program image. The accessory cannot be altered by an attacker by replacing the program image alone without adding additional memory to the accessory first, requiring the attacker to make a hardware change. By padding the memory with random data and thus implicitly including the random data in the authentication process, an attacker is further prevented from being able to make unauthorized changes to the program image without being detected.

The end result is that the host system can have some assurance that the accessory's program code has not been maliciously changed.

BRIEF DESCRIPTION OF DRAWINGS

For the purposes of description, but not of limitation, an embodiment is explained in greater detail by way of example with reference to the accompanying drawings, in which.

DETAILED DESCRIPTION OF EMBODIMENTS

Figure 1:
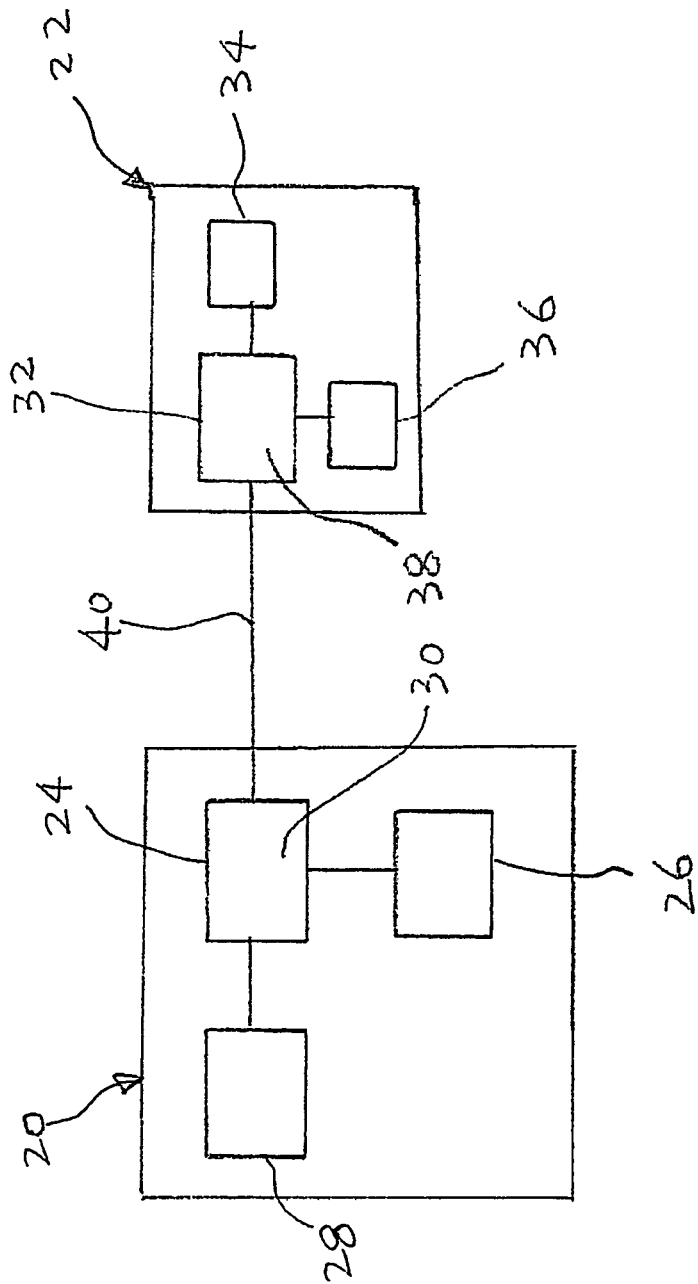
FIG. 1 is a block diagram showing a host system communicating with an accessory.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Referring to FIG. 1, there is shown a host 20 communicating with an accessory 22. Host 20 is generally a computer system that has a CPU 24, host memory device 26 accessible to CPU 24, host storage media 28, also accessible to CPU 24, and some input and output devices (not shown). Application program 30 executes on CPU 24. Application program 30 may be stored on host storage media 28, which may be permanently installed in host 20, removable from host 20 or remotely accessible to host 20. Application program 30 communicates with and directs the operation of accessory 22.

Accessory 22 generally has some computation power. Typically, it has a microprocessor or a microcontroller 32. Accessory 22 may also have other types of programmable processors that have adequate computation power. For example, accessory 22 may be one equipped with a DSP (digital signal processor) or a FPGA (Field-Programmable Gate Array). The processor, or microcontroller 32 generally has access to a memory storage space that may be divided into accessory memory device 34 and volatile memory device 36. Firmware program code 38, or embedded program code or micro-code, executes on microcontroller 32 and supplements application program 30 executing on host 20 to further control operations of accessory 22.

Firmware program code 38 and persistent (constant) data may be stored on accessory memory device 34, or any persistent medium. Volatile data, i.e., data related to operative state of the program, may be stored on volatile memory device 36. Either accessory memory device 34 or volatile memory device 36 may also be used to store semi-persistent data, i.e., data persistent across power cycles but that may be programmatically modified during each power cycle.

Data link 40 provides a communication channel between application program 30 and firmware program code 38 when needed. Data link 40 may be wired or wireless. For example, it may be a connection cable or a radio frequency connection. It may be a direct connection between host 20 and accessory 22 or relayed through some intermediary host systems. The data link 40 may be permanent, or more preferably, a connection that is established on demand.

Each of application program 30 and firmware program code 38 has application program interfaces (APIs) for communicating with each other. In particular, as will be described later, firmware program code 38 has an API that application program 30 calls to forward a list of memory addresses and an API through which firmware program code 38 returns a representative value such as a digest calculated based on the contents of a list of memory addresses. Although conceptually, firmware program code 38 is described to have two separate APIs, these two APIs may be implemented as a single API in practice. Application program 30 also has corresponding APIs for sending the list of memory addresses and for receiving the returned representative value.

While the distinction is made here that there is a host memory device 26 which tends to be used for storing more volatile data and a host storage media 28 which tends to be used for storing more persistent data, host 20 may have only a single data storage device for storing both volatile and persistent data. Similarly, accessory 22 may have only a single memory device for storing both volatile and persistent data.

As will be appreciated, host 20 may be a general purpose computer, a custom tailored special purpose computer, or some other programmable computation devices. Further, although host 20 is shown and described as a single computer system, it is only for the convenience of description. Host 20 is understood to be collectively the combined system, which may include several computer systems, for performing the tasks as described. As will be appreciated by one of skilled in the art, the computation and storage performed by host 20 may be distributed among several networked computers without affecting the functioning of the system and the performance of the method described herein.

Figure 2:
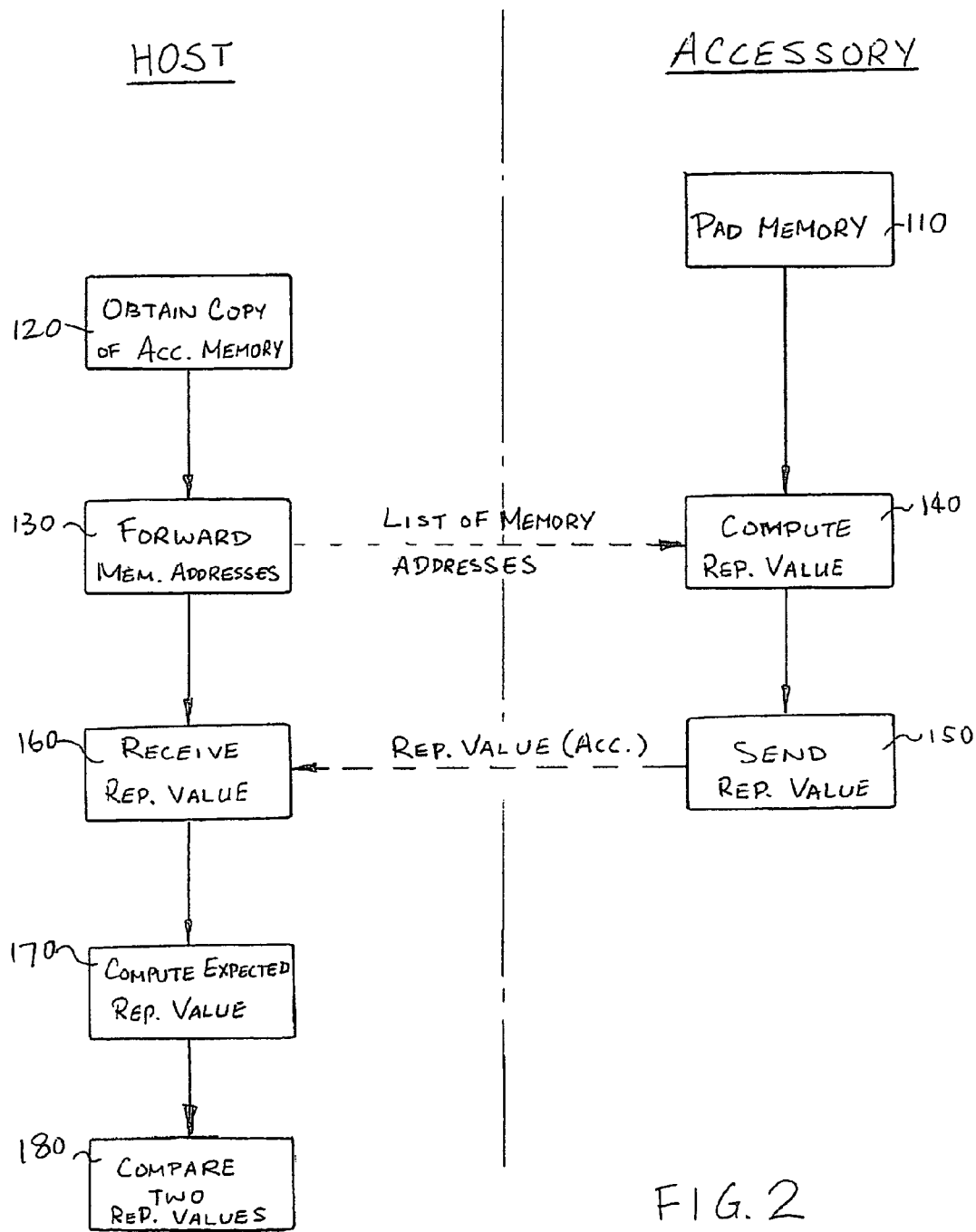
FIG. 2 is a flowchart diagram illustrating steps of a method for verifying the integrity of program code in the accessory shown in FIG. 1.
Figure 3:
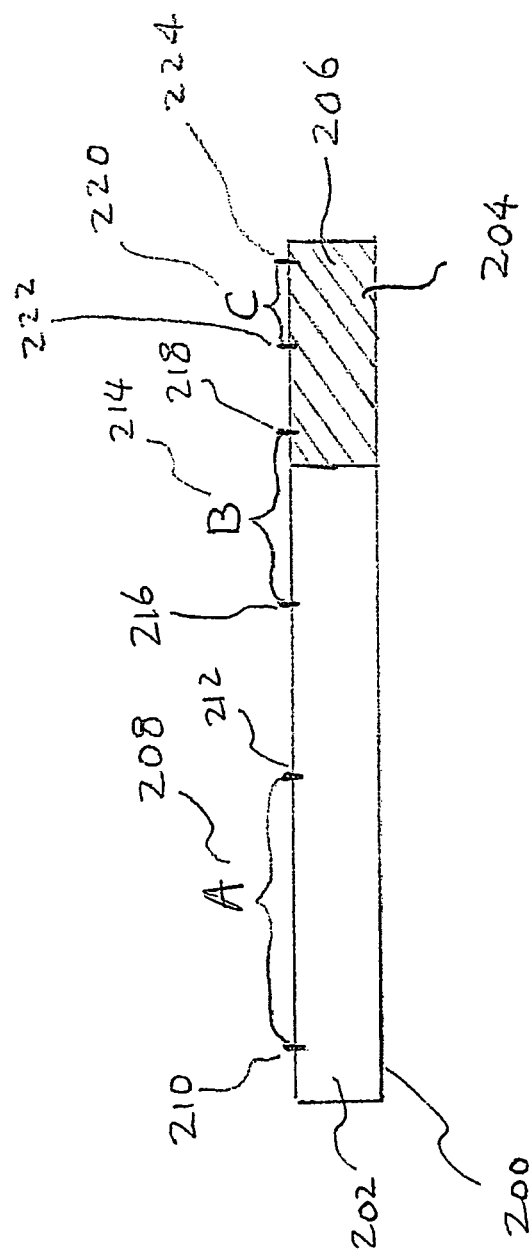
FIG. 3 shows schematically unused memory space on the accessory shown in FIG. 1 padded with random data and memory ranges on the accessory randomly selected by the host system.

Referring to FIGS. 2 and 3, an example of a method of verifying the integrity of firmware program code 38 is described in detail. In FIG. 2, to the left of the dotted line are operations generally performed by host 20 or on components of host 20. To the right of the dotted line in FIG. 2 are operations generally performed by accessory 22 or on components of accessory 22.

Typically, the size of firmware program code 38 is smaller than the size of memory available on accessory memory device 34. In other words, accessory memory device 34 typically has unused memory space, i.e., space not occupied by firmware program code 38 nor data associated with firmware program code 38. To limit the ability of an adversary to use the unused memory space for storing any unauthorized code, prior to verification, all unused memory space is filled with random data. The random data preferably has high entropy. High entropy random data tends to be difficult to compress while data that possess randomness but of low entropy tends to compress well. Preferably, all memory space on accessory memory device 34 is occupied by incompressible data. Filling all memory space with incompressible data discourages an adversary from compressing the data and thereby gaining memory space. A number of random number generation algorithms are available for generating high entropy random data. For example, the random number generation algorithms specified in "Change Notice 1" of Federal Information Processing Standards Publication 186-2, "Digital Signature Standard", issued by the National Institute of Standards and Technology (NIST) of the United States of America, may be used. In addition, block encrypting data of lower entropy tends to produce output of higher entropy.

At step 110, all unused memory on accessory device 22 is filled with random data and a trusted copy of the padded memory image is retrieved for later reference or use. Although this step may be performed by accessory device 22, there are existing tools that allow one to fill all unused memory with randomly generated high entropy data. Generally, the randomness of the data is controlled by the tool that is employed to fill the unused memory space. Preferably, memory padding is performed at a development facility or manufacturing site before the accessory is released to the market.

After padding with random data, all memory space on accessory 22 is occupied. Referring to FIG. 3, accessory memory space 200 may be divided into contiguous program code and persistent data space 202 and unused memory space 204. Unused memory space 204 is filled with random data 206. Although FIG. 3 shows that firmware program code 38 occupies a contiguous segment of memory, namely a contiguous portion of program code and persistent data space 202, it is possible that firmware program code 38 may occupy several disjoint memory segments. Similarly, persistent (constant) data may occupy a contiguous segment of memory or several disjoint memory segments. Whether or not program code and persistent data space 202 is contiguous, all the unused memory space will be filled, or padded with random data.

As will be appreciated, accessory memory space 200 may include memory space occupied by volatile data on volatile memory device 36. Memory elements that do not change over the validation process (or change in a well defined fashion) can be validated. Accessory memory space 200 may also include memory space occupied by data on a "peripheral" memory device, such as a serial EEPROM. In fact, accessory memory space 200 may even include portions outside the physical space of both accessory memory device 34 and volatile memory device 36 (but these addresses fold back as shadow of physical addresses). These, of course, require that accessory 22 (and host 20) support a memory addressing scheme that can address any and all available memory spaces and support special memory configurations such as bank-switching, overlays and shadowing. In fact, different memory addressing schemes and special memory configurations may be exploited to further enhance the security. For example, when validated memory addresses correspond to memory spaces outside the physical memory space, it would be difficult for a modified program requiring a compatible but larger memory footprint to emulate the validation process of the original program and the smaller device while running on the necessarily larger device.

An image of memory on accessory 22, with no unoccupied memory spaces left, is retrieved for later reference, or use. The image is generated and saved in a trusted fashion. For example, the image may be obtained from accessory 22 during a trusted operation, such as programming at a manufacturing site of accessory 22. It is also possible that the factory programs accessory images in bulk and the image is generated elsewhere at a development facility that also generates host code and data images. However the image is generated, the image is produced and provided in a trusted fashion. When the image is saved, the image is also saved in a trusted fashion. The end result is that a trusted copy of the image can be obtained when needed.

Host 20 obtains a trusted copy of the image of memory on accessory 22, with no unoccupied memory spaces left, at step 120. In general, host 20 does not store the trusted image locally in order to minimize the risk of the image being tempered with. Instead, host 20 is provided with access to a trusted copy of the image. Although only one trusted memory image is referenced here, it is possible that several different memory images of accessory 22 must be made available to host 20. This is because accessory 22 may have been upgraded several times over time by its manufacturer. Each previous upgrade would result in a different memory image. When accessory 22 is upgraded in the field, accessory 22 may correspond to any one of the several upgrades, or even its original version.

As will be appreciated, although this step is described as the next following the saving of a trusted copy of the memory image, these two steps may be many days, months or even years apart. It is possible that the trusted copy of the memory image is saved during manufacturing of the accessory and the retrieval of a trusted copy of the image happens many years later when a fix is applied to the accessory deployed in the field. Further, although this step is described as a first step on the host side, this is not necessary. This step needs to be completed prior to computing the expected representative value and may be performed any time before the computation.

Referring to FIG. 2, host 20 at step 130 sends accessory 22 a list of memory addresses to initiate the verification process. The list may be a range of memory addresses or several ranges of memory addresses on the accessory memory device 34. For example, FIG. 3 shows three randomly selected memory segments, or memory ranges: a first memory range 208, or memory segment A, between first starting address 210 and first ending address 212, a second memory range 214, or memory segment B, between second starting address 216 and second ending address 218, and a third memory range 220, or memory segment C, between third starting address 222 and third ending address 224.

The list, or the ranges of memory addresses, is random in nature or at least unpredictable so that the ranges cannot be anticipated by accessory 22, i.e., the list cannot be anticipated by an adversary attempting to alter maliciously the firmware code stored on accessory 22. Not only the selection of starting and ending points is unpredictable, so is the ordering of the selected memory ranges. For example, the list may contain the addresses of segment C as the first range, the addresses of segment A as the second range and the addresses of segment B as the third range. Changing the ordering of the selected memory ranges produces a different list and would also produce a different representative value at step 140, as will be described below. The list is typically generated by host 20. However, the list may be generated in any way as long as the list is truly unpredictable and different each time it is generated. As host 20 generally has more computation power, host 20 typically generates and sends the list to accessory 22.

In one exemplary implementation, one of the memory address ranges included in the list always contains the program code that is considered critical to the operation of accessory 22. In other words, host 20 always includes a memory segment that contains the entire critical code of application program 30. Although the memory containing the critical code is always included in the selected memory ranges, the memory segment containing the critical code may be randomly arranged within the list, as described above.

Upon receiving the list of memory addresses, accessory 22 produces at step 140 a value that takes as inputs the list of memory addresses and the memory values at the supplied addresses. The value generated is representative of the memory values at the supplied addresses. A number of algorithms may be used to produce the value, provided the value produced is representative of the list and the actual values at the supplied memory addresses. For example, the values of the memory at the supplied memory addresses may be first read and then concatenated together into a string. The string will then be the representative value. Preferably, the representative value is a digest computed using a secure hashing algorithm. The secure hashing algorithm computes the digest using the memory values at the supplied memory addresses as its input. Any digesting algorithms with the security properties of the SHA (Secure Hash Algorithm) may be used. The secure hash function may be one based on SHA-1 or MD5, for example. Preferably, one can use a digesting algorithm with the security properties of the SHA already existed in an accessory implementation; otherwise, one of SHA-1 or SHA-256, depending on the efficiency on the specific processor type of accessory 22, may be used. Accessory 22 returns, i.e., sends, the resulting representative value to host 20 at step 150, which is received by host 20 at step 160.

The example shown in FIG. 3 has first memory range 208 corresponding to memory spaces occupied entirely by persistent data and firmware program code 38, third memory range 220 corresponding to unused memory spaces 204 filled with random data, and second memory range 214 corresponding to a section of memory that contains partly firmware program code 38 and partly random data. As will be appreciated, other selections are possible. What is important is that the possible set of lists (that can be requested by host 20) be sufficiently large and that the selection of addresses is truly unpredictable. This tends to discourage precomputing all (or even a significant subset of) corresponding representative values as the computation may be expensive or even infeasible, both from a storage and computation perspective.

Firmware program code 38 may have modules implementing one or several of these secure hashing algorithms. Where only one secure hashing algorithm is implemented, the accessory computes a digest using the implemented secure hash function, taking the memory ranges received as input, and sends the resulting digest to the host system. Where the firmware program code 38 implements more than one secure hashing algorithm, a digest using one of the implemented secure hashing algorithms is produced. The resulting digest, together with an indication of the secure hashing algorithm used, is sent to host 20. As will be appreciated, either host 20 or accessory 22 may select a particular secure hashing algorithm and inform the other the secure hashing algorithm used to produce the digest.

When retrofitting a firmware, the firmware program code 38 may not have an API for receiving the list of randomly generated memory addresses. It also may not have a module for producing a digest using a secure hash algorithm. In order to prepare such an accessory for a secure upgrade, namely, an upgrade that is performed only if the firmware code can be authenticated, it will be necessary to first retrofit authentication function on to the accessory. In other words, it will be necessary to first rewrite the existing program on accessory 22 to include an additional API that can be called by host 20 for receiving the list of memory addresses and an additional API that can return to the host a representative value computed from the list. The rewritten firmware program will also include a module for computing a representative value or a module or modules for implementing secure hashing algorithms for computing a digest.

After host 20 receives the resulting digest or the representative value at step 160 from accessory 22, host 20 uses the trusted copy of the memory image of the accessory to compute an expected representative value at step 170. Preferably, the same algorithm used by accessory 22 is used by host 20 to produce the expected representative value. But this is not necessary. The algorithm used by host 20 only needs to be equivalent to that used by accessory 22 so that the expected representative value will be the same as the received representative value. If accessory 22 implements more than one secure hashing algorithm but uses only one to compute a digest, host 20 selects the same or equivalent algorithm to compute the expected representative value.

At step 180, host 20 compares the representative value received from accessory 22 with the expected representative value that was computed locally to verify the accessory program image. Firmware program code 38 will not be authenticated if these two values are not identical or equivalent to each other.

As described, the first step of this method is to ensure that all memory on the accessory is occupied. If the compiled program that is used to implement the accessory's functionality is smaller than the physical memory on the accessory, the remainder is padded with truly random and high entropy data. The padded data becomes part of the memory image that is made available to the host system during a retrofitting upgrade.

In a further exemplary implementation, host 20 sends a string of data at step 130 along with the list of memory addresses to accessory 22. The string may be random, or it may include an identification information such as the unique identity of the accessory (or even the host system). When the string is used as auxiliary input to the secure hash function, the method is typically referred to as a challenge-response method. However, it still relies on random padding data in the memory image to prevent the injection of illicit program code into the accessory.

Various examples have now been described in detail. Those skilled in the art will appreciate that numerous modifications, adaptations and variations may be made to the examples without departing from the scope of the invention. Since changes in and or additions to the above-described best mode may be made without departing from the nature, spirit or scope of the invention, the invention is not to be limited to those details but only by the appended claims.

What is claimed is:

1. A method of verifying integrity of program code embedded in an accessory, said accessory having a memory device for storing the program code and data associated with the program code, all unused memory space of the memory device being filled with random data, a host having access to a memory image of the memory device, said method comprising the steps of:
   sending a list of memory address ranges to the accessory, said memory address ranges each being defined by end points unpredictable to the accessory, said list specifying said memory address ranges in a sequence unpredictable to the accessory;
   receiving a value from the accessory, said value being generated from and representative of values of memory at memory addresses in said memory address ranges arranged according to said sequence specified in said list;
   producing an expected value from a copy of the memory image and said list; and
   comparing said value received from the accessory with said expected value;
wherein the integrity of the program code is verified if said received value is equivalent to said expected value.

2. The method of claim 1, wherein said value is a concatenation of said values of memory at said memory addresses in said memory address ranges arranged according to said sequence specified in said list.

3. The method of claim 1, wherein said value is a digest computed using a secure hashing algorithm with said values of memory at said memory addresses as input thereto and said expected value is an expected digest computed using a second secure hashing algorithm equivalent to said secure hashing algorithm.

4. The method of claim 3, further comprising the step of:
   sending a random data string to the accessory,
wherein the digest is computed taking the random data string received as an additional input, and the expected digest is produced taking the random data string as a second input.

5. The method of claim 1, wherein at least one of said memory addresses is selected to include a pre-determined portion of the program code.

6. The method of claim 1, wherein said sequence is randomized.

7. The method of claim 1, wherein said endpoints are randomized.

8. A method of preparing an accessory for authenticating its firmware program code, said firmware program code and data associated with said firmware program code being stored in a memory device of said accessory, said method comprising the steps of:
   providing said firmware program code with a first API for receiving a list of memory address ranges from a host, addresses in said memory address ranges corresponding to memory addresses on said memory device addressable by said firmware program code and each memory address range being defined by end points unpredictable to the accessory, said list specifying said memory address ranges in a sequence unpredictable to the accessory, providing said firmware program code with a secure hash program for producing a digest from said list and values of memory at said memory addresses in said memory address ranges arranged according to said sequence specified in said list, providing said firmware program code with a second API for returning said digest to said host, filling all memory space of memory device unoccupied by said firmware program code and said data with random data, and providing a memory image of said memory device for reference, wherein said firmware program code is authenticated if in an authentication operation, said digest is equivalent to an expected digest, said expected digest being computed by said host from a copy of said memory image using said list.

9. The method of claim 8, wherein at least one of said memory address ranges is selected to include a pre-determined portion of the program code.

10. The method of claim 8, wherein said sequence is randomized.

11. The method of claim 8, wherein said endpoints are randomized.

12. An accessory having an authenticatable firmware program code, said firmware program code and data associated with said firmware program code being stored in a memory device of said accessory, all memory space of said memory device not occupied by said firmware program code and said data being entirely occupied by random data, said accessory having an externally stored memory image of said memory device, said firmware program code comprising:

an API for receiving a list of memory address ranges from a host, addresses in said memory address ranges corresponding to memory addresses on said memory device addressable by said firmware program code, each memory address range being defined by endpoints unpredictable to the accessory, and said list specifying said memory address ranges in a sequence unpredictable to the accessory;

a secure hash program for producing a digest from said list and values of memory at said memory addresses in the memory address ranges arranged according to the sequence specified in said list; and a second API for returning said digest to said host, wherein said host is configured to produce an expected digest from a trusted copy of said memory image using said list and is configured to compare said expected digest with said digest returned from said firmware code to authenticate said firmware program code.

13. The accessory of claim 12, wherein at least one of said memory addresses is selected to include a pre-determined portion of the program code.

14. The accessory of claim 12, wherein said sequence is randomized.

15. The accessory of claim 12, wherein said endpoints are randomized.

* * * * *